(No Model.)
J. O'NEILL.
HANDLE.
No. 591,547.  Patented Oct. 12, 1897.
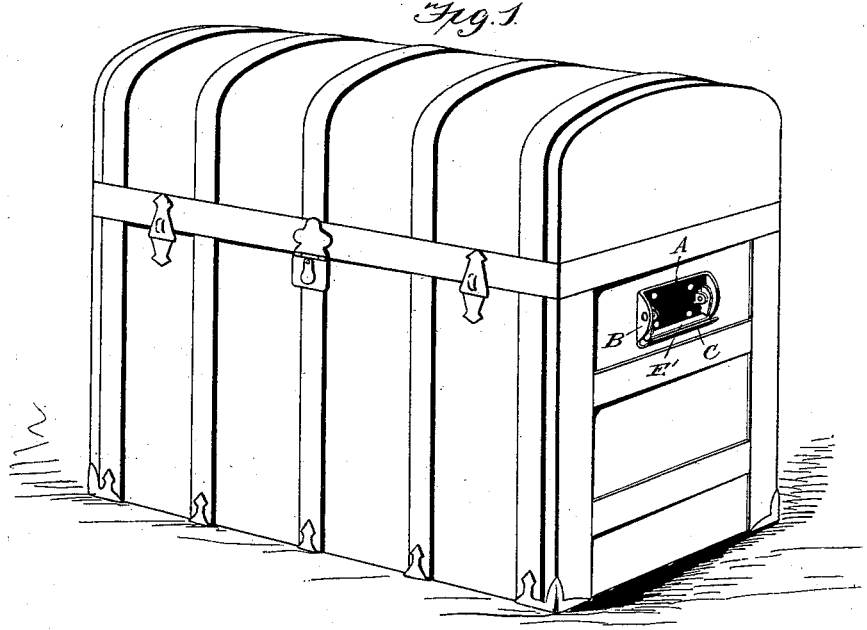
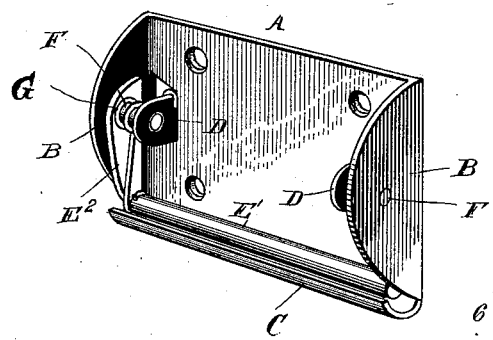
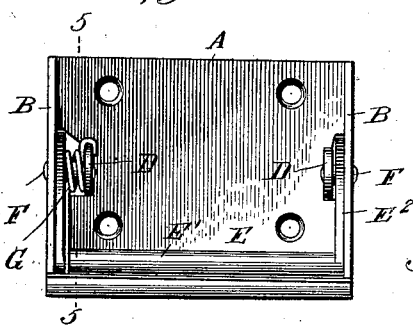
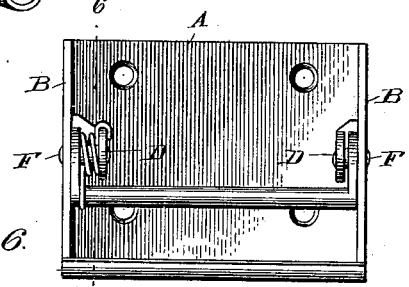
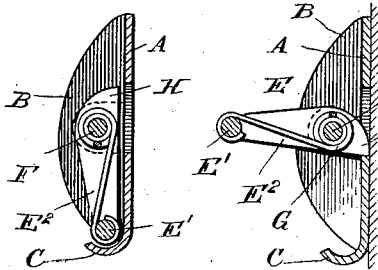
WITNESSES:
J. C. Shaw
Chas. E. Brock
INVENTOR
James O'Neill,
BY
O'Meara & Co.
ATTORNEYS
THE NORRIS PETERS CO., PHOTO-LITHO., WASHINGTON, D. C.

UNITED STATES PATENT OFFICE.

JAMES O'NEILL, OF WALLACE, IDAHO.

HANDLE.

SPECIFICATION forming part of Letters Patent No. 591,547, dated October 12, 1897.

Application filed June 6, 1896. Renewed August 20, 1897. Serial No. 648,960. (No model.)

*To all whom it may concern:*

Be it known that I, JAMES O'NEILL, residing at Wallace, in the county of Shoshone and State of Idaho, have invented a new and Improved Handle for Trunks, Boxes, &c., of which the following is a specification.

This invention is an improved handle and is adapted for use upon trunks, tool-chests, and all heavy articles.

The main object of the invention is to provide a handle which will normally rest flat against the trunk or chest, and is therefore not liable to be broken off.

Another object is to provide a handle which shall be protected against accident during traveling or transportation, and a still further object is to provide a handle which will remain in its protected position no matter in what position the trunk or chest is turned.

Another object is to provide a handle which is exceedingly cheap and simple, easily constructed and attached, and highly efficient in operation.

With these various objects in view my invention consists, broadly, in the employment of a plate having flanges at the side and bottom and ears struck up from the body of plate and parallel with the side flanges and a handle pivoted between the side flanges and parallel ears and adapted to normally rest upon the bottom flange, said handle being so held by spring-pressure.

My invention consists also in certain details of construction and novelties of combination, all of which will be fully described hereinafter, and pointed out in the claims.

In the drawings forming a part of this specification, Figure 1 is a view showing the invention in use. Fig. 2 is a perspective view. Fig. 3 is a detail face view of the handle closed. Fig. 4 is a similar view showing it open. Fig. 5 is a section on the line 5 5 of Fig. 3. Fig. 6 is a section on the line 6 6 of Fig. 4.

In carrying out my invention I employ a metal plate A, which is turned up or flanged at each end, as shown at B, said flanges being gradually curved or rounded to prevent sharp corners. The bottom edge of the plate is also curved up or flanged, as shown at C, said flanges being curved longitudinally, providing a groove, as it were, at the bottom of the plate. This plate A is made of light metal and is screwed or otherwise secured to the ends of the trunk or chest.

Forwardly-projecting ears D D are punched up from the plate A near each end, said ears being parallel with the end flanges, and pivoted between these ears and flanges is the handle E, comprising a grip portion E' and hinge portions E² between the ears and flanges, as shown, and pivotally secured by the hinge-pintles F, and in order to hold the handle normally down against the plate and within the side and bottom flanges I employ a spring G, which is coiled about one of the pintles F and bears at one end upon the plate A and upon the handle at the other, thus holding the said handle down; but when the handle is to be used it can be easily lifted against the spring to an operative position, and to prevent said handle swinging too far upward I provide the projecting ends H, which abut against the edges of the cut-out portion and thus limit the upward movement of the handle.

It will thus be seen that I provide an exceedingly cheap, simple, and durable form of handle, one which is protected against breakage by the side and bottom flanges, and one which is normally held in such protected position by means of spring-pressure.

It will also be noticed that the plate, with its flanges and ears performing double functions, are all of one piece, and the entire device comprises only four parts.

Having thus described my invention, what I claim, and desire to secure by Letters Patent, is—

1. The combination with the plate, having end flanges and parallel ears struck up from the body of plate and the handle proper pivoted between said flanges and ears substantially as shown and described.

2. The combination with the plate, having end and bottom flanges and ears parallel with the end flanges, the handle pivoted between the ears and flanges and the spring attached to handle and bearing upon the plate substantially as shown and described.

JAMES O'NEILL.

Witnesses:
JOHN M. FINN,
CHAS. F. EASTON.